United States Patent
Yamada et al.

(10) Patent No.: US 9,843,038 B2
(45) Date of Patent: Dec. 12, 2017

(54) POSITIVE ELECTRODE FOR LITHIUM ION SECONDARY BATTERY AND LITHIUM ION SECONDARY BATTERY INCLUDING THE SAME

(71) Applicant: Samsung Electronics Co., Ltd., Suwon-si, Gyeonggi-do (KR)

(72) Inventors: Takanobu Yamada, Yokohama (JP); Yasuaki Matsuda, Tsu (JP); Masaki Matsui, Tsu (JP); Yuichi Aihara, Yokohama (JP); Nobuyuki Imanishi, Tsu (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/449,092

(22) Filed: Mar. 3, 2017

(65) Prior Publication Data

US 2017/0179481 A1   Jun. 22, 2017

Related U.S. Application Data

(63) Continuation of application No. 14/800,907, filed on Jul. 16, 2015, now Pat. No. 9,608,288.

(30) Foreign Application Priority Data

Jul. 17, 2014 (JP) .................... 2014-147024
Apr. 15, 2015 (KR) .................. 10-2015-0053140

(51) Int. Cl.
   *H01M 4/36*      (2006.01)
   *H01M 10/0562*   (2010.01)
   (Continued)

(52) U.S. Cl.
   CPC ........... *H01M 4/366* (2013.01); *H01M 4/131* (2013.01); *H01M 4/136* (2013.01);
   (Continued)

(58) Field of Classification Search
   CPC ........ H01M 4/13; H01M 4/131; H01M 4/139; H01M 4/1391; H01M 4/505; H01M 4/525;
   (Continued)

(56) References Cited

U.S. PATENT DOCUMENTS 7,993,782 B2    8/2011  Takada et al.
2008/0131778 A1*  6/2008  Watanabe ............. H01M 4/131
                                                  429/220

(Continued)

FOREIGN PATENT DOCUMENTS

EP    2418655 A1    2/2012
JP    2008103204 A  5/2008
(Continued)

OTHER PUBLICATIONS

Sakuda et al., "All-solid-state lithium secondary batteries with oxide-coated LiCoO2 electrode and Li2S—P2S5 electrolyte", Journal of Power Sources, vol. 189, 2009, pp. 527-530.

(Continued)

*Primary Examiner* — Mark F Huff
*Assistant Examiner* — Monique Wills
(74) *Attorney, Agent, or Firm* — Cantor Colburn LLP

(57) ABSTRACT

A positive electrode for a lithium ion secondary battery, the positive electrode including: a coated particle including a positive active material particle and a reactive layer on the surface of the positive active material particle; and a sulfide-containing solid electrolyte particle which is in contact with the coated particle, wherein the reactive layer includes a reactive element other than lithium and oxygen, wherein the reactive element has a reactivity with the sulfide-containing solid electrolyte particle which is greater than with a reactivity of the reactive element with a transition metal element included in the positive active material particle, and wherein (Continued)

a ratio of a thickness of the reactive layer to a particle diameter of the positive active material particle is in a range of about 0.0010 to about 0.25.

15 Claims, 4 Drawing Sheets

(51) Int. Cl.
| | |
|---|---|
| *H01M 10/0525* | (2010.01) |
| *H01M 4/505* | (2010.01) |
| *H01M 4/525* | (2010.01) |
| *H01M 4/58* | (2010.01) |
| *H01M 4/131* | (2010.01) |
| *H01M 4/136* | (2010.01) |
| *H01M 4/1391* | (2010.01) |
| *H01M 4/1397* | (2010.01) |
| *H01M 4/62* | (2006.01) |

(52) U.S. Cl.
CPC ....... *H01M 4/1391* (2013.01); *H01M 4/1397* (2013.01); *H01M 4/505* (2013.01); *H01M 4/525* (2013.01); *H01M 4/5825* (2013.01); *H01M 4/622* (2013.01); *H01M 10/0525* (2013.01); *H01M 10/0562* (2013.01); *H01M 2300/0068* (2013.01)

(58) Field of Classification Search
CPC .... H01M 10/052; Y02P 70/54; Y02E 60/122; Y02T 10/7011
See application file for complete search history.

(56) References Cited

U.S. PATENT DOCUMENTS

| | | | |
|---|---|---|---|
| 2011/0027661 A1 | 2/2011 | Okazaki et al. | |
| 2011/0045348 A1* | 2/2011 | Kubo | H01M 4/36 429/209 |
| 2013/0040208 A1 | 2/2013 | Kanno et al. | |
| 2013/0065135 A1 | 3/2013 | Takada et al. | |

FOREIGN PATENT DOCUMENTS

| | | | |
|---|---|---|---|
| JP | 2008251520 | A | 10/2008 |
| JP | 2009193940 | A | 8/2009 |
| JP | 2009541938 | A | 11/2009 |
| JP | 2010040439 | A | 2/2010 |
| JP | 201073539 | A | 4/2010 |
| JP | 2011044368 | A | 3/2011 |
| JP | 2011519139 | A | 6/2011 |
| JP | 2013033659 | A | 2/2013 |
| JP | 2013089321 | A | 5/2013 |
| JP | 2013175412 | A | 9/2013 |
| JP | 2013206790 | A | 10/2013 |
| JP | 2014116149 | A | 6/2014 |
| WO | 2007004590 | A1 | 1/2007 |
| WO | 2011125499 | A1 | 10/2011 |
| WO | 2012077225 | A1 | 6/2012 |

OTHER PUBLICATIONS

Sakuda et al., "Electrochemical performane of all-solid-state lithium secondary batteries improved by the coating of Li2O—TiO2 films on LiCoO2 electrode", Journal of Power Sources, vol. 195, 2010, pp. 599-603.

Takada et al., "Progress and prospective of solid-state lithium batteries", SciVerse ScienceDirect, Acta Materialia 61, 2013, 759-770.

* cited by examiner

POSITIVE ELECTRODE FOR LITHIUM ION SECONDARY BATTERY AND LITHIUM ION SECONDARY BATTERY INCLUDING THE SAME

CROSS-REFERENCE TO RELATED APPLICATIONS

This application it is a Continuation of U.S. patent application Ser. No. 14/800,907, filed on Jul. 16, 2015, and claims priority to and the benefit of Japanese Patent Application No. 2014-0147024, filed on Jul. 17, 2014, in the Japanese Intellectual Property Office, and Korean Patent Application No. 10-2015-0053140, filed on Apr. 15, 2015, in the Korean Intellectual Property Office, and all the benefits accruing therefrom under 35 U.S.C. §119, the contents of which applications are incorporated herein in their entirety by reference.

BACKGROUND

1. Field

The present disclosure relates to a positive electrode for a lithium ion secondary battery and a lithium ion secondary battery including the positive electrode.

2. Description of the Related Art

Lithium ion secondary batteries have high charging/discharging capacity, high driving potential, and good charging/discharging cycle characteristics, and thus demand has risen for using the lithium ion secondary batteries in motorcycles, electric vehicles, or hybrid electric vehicles, which use a portable information terminal, a portable electronic device, a small-sized electric energy storage device for home use, and a motor as driving sources. The lithium ion secondary batteries use, as an electrolyte, a non-aqueous electrolyte solution prepared by dissolving a lithium salt in an organic solvent, but there are safety concerns due to easy ignition and leakage of non-aqueous electrolyte solution. Thus, to improve safety of lithium ion secondary batteries, research has been actively conducted into an all solid-state lithium ion secondary battery using a solid electrolyte consisting of a non-combustible inorganic material (hereinafter, referred to as 'all solid-state secondary battery').

A nitride or an oxide may be used as the solid electrolyte of the all solid-state secondary battery, and due to its conductivity of lithium ions, a sulfide-containing solid electrolyte is considered as a promising material. However, when a sulfide-containing solid electrolyte is used, a reaction between a positive active material particle and a solid electrolyte particle may occur at an interface therebetween during charging of a battery, and thus an interfacial resistant component may be produced, resulting in an increase in resistance at the interface between the positive active material particle and the solid electrolyte particle (hereinafter, also referred to as 'interface resistance') during the movement of the lithium ions. Due to the increase in the interface resistance, the conductivity of lithium ions decreases, and thus output of the lithium ion secondary battery may be deteriorated.

In this regard, attempts have been made to reduce the interface resistance by coating a surface of a positive active material particle, e.g., LiCoO$_2$ (hereinafter, also referred to as 'LCO'), with another material.

However, a process of coating the surface of the positive active material particle with an oxide, e.g., SiO$_2$, or a process of arranging a buffer layer or an interlayer between a positive electrode layer and a solid electrolyte layer is not sufficient enough to inhibit a reaction at the interface between the positive electrode active material particle and the solid electrolyte particle. Such a process rather requires further reduction in the resistance component.

SUMMARY

Provided are, a positive electrode that is capable of inhibiting a reaction at an interface between a positive active material and a sulfide-containing solid electrolyte particle, and a lithium ion secondary battery including the positive electrode.

Additional aspects will be set forth in part in the description which follows and, in part, will be apparent from the description.

According to an embodiment, a positive electrode for a lithium ion secondary battery includes: a coated particle including a positive active material particle and a reactive layer on a surface of the positive active material particle; and a sulfide-containing solid electrolyte particle which is in contact with the coated particle, wherein the reactive layer includes a reactive element other than lithium and oxygen, wherein the reactive element has a reactivity with the sulfide-containing solid electrolyte particle which is greater than a reactivity of the reactive element with a transition metal element included in the positive active material particle, and wherein a ratio of a thickness of the reactive layer to a particle diameter of the positive active material particle is in a range of about 0.0010 to about 0.25.

The ratio of the thickness of the reactive layer to the particle diameter may be determined by dividing a thickness of the reactive layer by a particle diameter of the positive active material particle.

The ratio of the thickness of the reactive layer to the particle diameter of the positive active material particle may be, for example, in a range of about 0.0016 to about 0.1.

In an embodiment, the thickness-to-diameter ratio may be in a range of about 0.0016 to about 0.01.

While not wanting to be bound by theory, it is understood that because the highly reactive element of the highly reactive layer has preferential reactivity with a sulfur element included in the solid electrolyte particles versus the transition metal included in the positive active material particles, the positive electrode may inhibit a reaction (e.g., a side reaction) between the transition metal element included in the positive electrode active material and the sulfur element included in the solid electrolyte. That is, a reaction at an interface of the positive active material particle and the sulfide-containing solid electrolyte particle may be further inhibited.

In an embodiment, the highly reactive element may have a lower standard enthalpy of formation for sulfide than that of the transition metal element included in the positive electrode active material particle.

In an embodiment, a standard enthalpy of formation for sulfide of the highly reactive element may be less than about −80 kJ/mol. When the standard enthalpy of formation for sulfide of the highly reactive element is within this range, a reaction at an interface of the positive active material particle and the sulfide-containing solid electrolyte particle may be further inhibited.

In an embodiment, in comparison of a first differential scanning calorimetry (DSC) test and a second DSC test, an initiation temperature for an exothermic reaction in the first DSC test may be higher than an initiation temperature for an exothermic reaction in the second DSC test, wherein the first DSC test may be performed by heating a mixture of the coated particle and the sulfide-containing solid electrolyte particle that are mixed at a mass ratio of 1:1, and the second DSC test may be performed by heating a mixture of the positive active material particle, which is not covered with the highly reactive layer, and the sulfide-containing solid electrolyte particle that are mixed at a mass ratio of 1:1.

In an embodiment, the initiation temperature for the exothermic reaction in the first DSC test may be higher than 250° C. When the initiation temperature for the exothermic reaction is within this range, a reaction at an interface of the positive active material particle and the sulfide-containing solid electrolyte particle may be further inhibited.

In an embodiment, a temperature at which a calorific value in the first DSC test reaches the highest value may be higher than 330° C. When the temperature at which the calorific value reaches the highest value is within this range, a reaction at an interface of the positive active material particle and the sulfide-containing solid electrolyte particle may be further inhibited.

In an embodiment, a portion of the highly reactive element may be included in the positive active material particle in the form of a solid solution. Accordingly, a reaction at an interface of the positive active material particle and the sulfide-containing solid electrolyte particle may be further inhibited.

In an embodiment, the highly reactive element may include at least one selected from aluminum (Al), magnesium (Mg), zirconium (Zr), titanium (Ti), tantalum (Ta), sodium (Na), potassium (K), calcium (Ca), strontium (Sr), barium (Ba), indium (In), molybdenum (Mo), lanthanum (La), cobalt (Co), and manganese (Mn).

In an embodiment, the sulfide-containing solid electrolyte particle may include phosphorus (P).

According to an embodiment, a lithium ion secondary battery includes: the positive electrode; a negative electrode including a negative active material; and a solid electrolyte layer disposed between the positive electrode and the negative electrode, the solid electrolyte layer including a sulfide-containing solid electrolyte particle.

Also a process of making a positive electrode for a lithium ion secondary battery, the process including: providing a sulfide-containing solid electrolyte particle, providing a positive active material particle containing a transition metal; coating the positive active material particle with a reactive layer including a reactive element other than lithium and oxygen, wherein the reactive element has a reactivity with the sulfide-containing solid electrolyte particle which is greater than a reactivity of the reactive element with a transition metal element included in the positive active material particle, and contacting the sulfide-containing solid electrolyte particle with the coated particle, wherein a ratio of a thickness of the highly reactive layer to a particle diameter of the positive active material particle is in a range of about 0.0010 to about 0.25 to make the positive electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
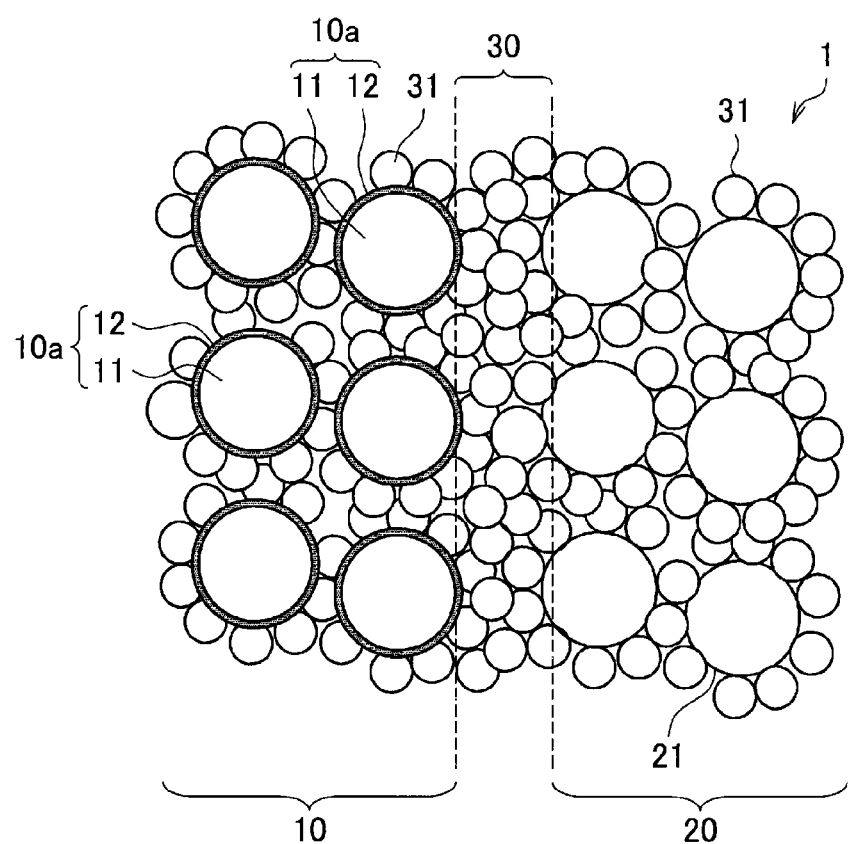
FIG. 1 is a schematic view illustrating a structure of a lithium ion secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed herein could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

Figure 4:
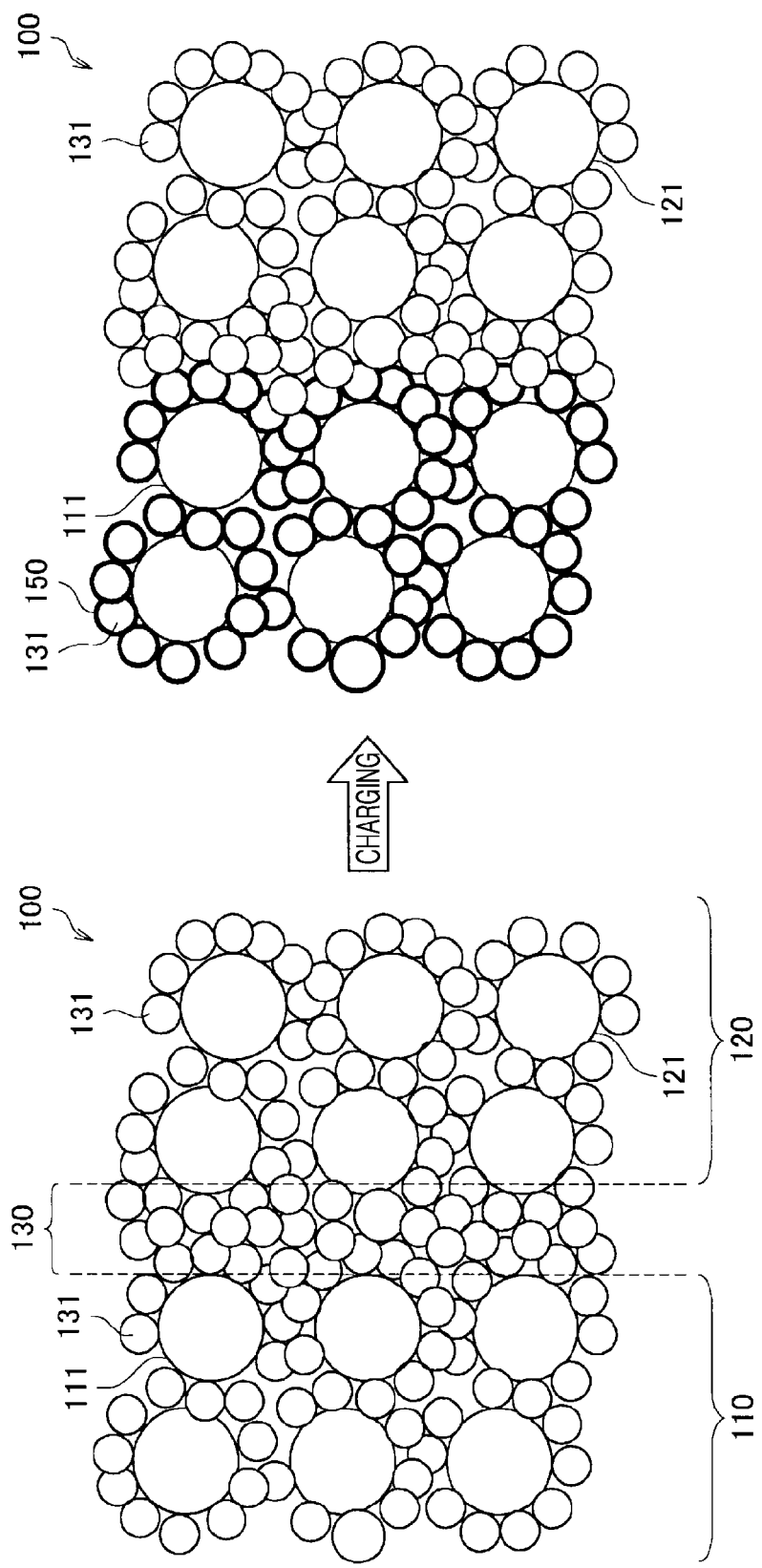
FIG. 4 is an explanatory diagram showing a typical all solid-state lithium ion secondary batter having an increased interface resistance.

Before describing a lithium ion battery according to an exemplary embodiment, problems occurring in the case of using a solid electrolyte will be described first by referring to FIG. 4. FIG. 4 is an explanatory diagram schematically illustrating a structure of a typical lithium ion secondary battery 100.

The lithium ion secondary battery 100 has a stacked structure including a positive electrode layer 110, a negative electrode layer 120, and a solid electrolyte layer 130. The positive electrode layer 110 is formed of mixed particles of a positive electrode active material particle 111 and a sulfide-containing solid electrolyte particle 131 (hereinafter, also referred to as 'a solid electrolyte particle 131'). Likewise, the negative electrode layer 120 is formed of mixed particles of a negative active material particle 121 and the solid electrolyte particle 131. The solid electrolyte layer 130 is disposed between the positive electrode layer 110 and the negative electrode layer 120, and is formed of the solid electrolyte particle 131.

In the lithium ion secondary battery 100 including a sulfide-containing solid electrolyte, since a positive active material and an electrolyte are both in a solid state, the electrolyte may have a difficulty in penetrating into the positive active material, compared to a case where a battery includes an organic electrolyte solution as an electrolyte. In addition, since an area of an interface between the positive active material and the electrolyte may easily reduce, it is also difficult to secure a moving pathway of lithium ions and electrons in the lithium ion secondary battery 100. Accordingly, as shown in FIG. 4, the positive electrode layer 110 is formed of mixed particles of the positive active material particle 111 and the sulfide-containing solid electrolyte particle 131, and the negative electrode layer 120 is formed of mixed particles of the negative active material particle 121 and the sulfide-containing solid electrolyte particle 131. In this regard, the area of the interface between the active material and the solid electrolyte may increase.

However, during charging of the lithium ion secondary battery 100, a reaction at the interface between the positive active material particle 111 and the solid electrolyte particle 131 may occur as described above, thereby forming a high resistive layer 150. In particular, the high resistive layer 150 is produced by a reaction between a transition metal element present on a surface of the positive active material particle 111 and a sulfur element present on a surface of the solid electrolyte particle 131. The term "high resistive layer" 150 used herein refers to a layer that is formed of a resistance component formed at the interface between the positive active material particle 111 and the solid electrolyte particle 131, and that has higher resistance during the movement of lithium ions than the resistance inside the positive active material particle 111 or inside the sulfide-containing solid electrolyte particle 131. Thus, the interface resistance between the positive active material particle 111 and the solid electrolyte particle 131 may increase. In addition, when the area of the interface between the positive active material particle 111 and the solid electrolyte particle 131 increases, a moving pathway of the lithium ions and electrons may be initially secured, but may decrease as the high resistive layer 150 forms. Accordingly, the movement of lithium ions from the positive active material particle 111 to the solid electrolyte particle 131 may be obstructed by the high resistive layer 150. Therefore, upon such a decrease in the conductivity of lithium ions, the output of the lithium ion secondary battery 100 is deteriorated.

The present inventors have undertaken study of whether the high resistive layer 150 is produced by chemical potential differences between lithium ions of the positive active material particles 111 and lithium ions of the solid electrolyte particles 131. However, techniques that can fully inhibit the production of the high resistive layer 150 are not established yet.

In this regard, the present inventors theorized that there may be factors affecting the production of the high resistive layer 150, other than the chemical potential differences, and thus examined the thermodynamic data of various metal sulfides. Accordingly, the present inventors determined that the reactivity between the metal elements included in the positive active material particles 111 and the sulfur elements included in the solid electrolyte particles 131 significantly affect the production of the high resistive layer 150.

In addition, the present inventors demonstrated that the production of the high resistive layer 150 is significantly inhibited by coating the positive active material particles 111 with a metal element having higher reactivity with the sulfur element included in the solid electrolyte particles 131 (hereinafter, also referred to as 'reactivity to the solid electrolyte particles 131') than with the transition metal element included in the positive active material particles 111 (hereinafter, also referred to as 'highly reactive element').

In this regard, the present inventors found that the highly reactive element has preferential reactivity with the sulfur element included in the solid electrolyte particles 131 over the transition metal element included in the positive active material particles 111, thereby inhibiting a reaction between the transition metal element and the sulfur element.

In addition, the present inventors reviewed indicators that classify metal elements having high reactivity to the solid electrolyte particles 131 (i.e., highly reactive elements) and metal elements having low reactivity to the solid electrolyte particles 131. Accordingly, the present inventors determined that standard enthalpy of formation for the sulfide of the metal element was a factor to be considered. That is, the present inventors discovered that low standard enthalpy of formation for the sulfide of the metal element (i.e., a greater value in a negative direction) is associated with high reactivity between the metal element and the sulfide-containing solid electrolyte particles 131.

Accordingly, the present inventors developed a lithium ion secondary battery according to an embodiment. As shown in FIG. 1, a lithium ion secondary battery 1 according to an embodiment may inhibit production of a high resistive layer by covering a positive active material particle 11 with a highly reactive layer 12 including a highly reactive element. Hereinafter, the lithium ion secondary battery 1 according to an exemplary embodiment will be described in detail.

Structure of Lithium Ion Secondary Battery

Referring to FIG. 1, a structure of the lithium ion secondary battery 1 according to an exemplary embodiment will be described in detail. FIG. 1 is an explanatory diagram schematically illustrating a structure of the lithium ion secondary battery 1 according to an embodiment.

As shown in FIG. 1, the lithium ion secondary battery 1 according to an exemplary embodiment is an all solid-state lithium ion secondary battery, and has a stacked structure including a positive electrode layer 10, an negative electrode layer 20, and a solid electrolyte layer 30 disposed between the positive electrode layer 10 and the negative electrode layer 20.

Positive Electrode Layer

The positive electrode layer 10 includes mixed particles of coated particles 10a and sulfide-containing solid electrolyte particles 31 (hereinafter, also referred to as 'solid electrolyte particles 31'). The coated particle 10a includes a positive active material particle 11 and a highly reactive layer 12 covering a surface of the positive active material particles 11. That is, the highly reactive layer 12 is in contact with the solid electrolyte particle 31. As described above, the lithium ion secondary battery including the solid electrolyte particles 131 may have a decreased output of the battery as an interface resistance increases due to a reaction at an interface of the positive active material particle 111 and the solid electrolyte particle 131. However, referring to the all solid-state lithium ion battery 1 according to an embodiment, the surface of the positive active material particles 11 is coated with the highly reactive layer 12 that includes a highly reactive element, and accordingly, the highly reactive layer 12 may inhibit a reaction (side reaction) between a sulfur element of the solid electrolyte particles 31 and a transition metal element of the positive active material particles 11. Thus, a resistant component (e.g., a high resistive layer) may not be easily formed at the interface between the positive active material particles 11 and the solid electrolyte particles 31.

In addition, the positive active material particle 11 may have the highly reactive layer 12, which is formed on at least a part of the surface of the positive active material particle 11. That is, the highly reactive layer 12 may be formed on the whole surface of the positive active material particle 11, or the highly reactive layer 12 may be formed on a part of the surface of the positive active material particle 11.

The highly reactive layer 12 formed on the surface of the positive active material particle 11 may be confirmed by, for example, a microscope image (images of a field emission scanning electron microscope (FE-SEM) and a transmission electron microscope (TEM)) analysis that uses a contrast difference caused by a difference in structures of the positive active material particle 11 and the highly reactive layer 12. Hereinafter, the positive active material particle 11 and the highly reactive layer 12 included in the positive electrode layer 10 will be described in detail.

Positive Electrode Active Material Particle

As a positive active material constituting the positive active material particle 11, any material capable of reversibly intercalating and deintercalating lithium ions may be used without particular limitation.

For example, the material may be a compound represented by one of formulae $Li_aA_{1-b}B'_bD_2$ (where $0.90 \le a \le 1$ and $0 \le b \le 0.5$); $Li_aE_{1-b}B'_bO_{2-c}D_c$ (where $0.90 \le a \le 1$, $0 \le b \le 0.5$, and $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD_\alpha$ (where $0.90 \le a \le 1$, $0 \le b \le 0.5$, $0 \le c \le 0.05$, and $0 < \alpha 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dGeO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}(PO_4)_3$ ($0 \le f \le 2$); and $LiFePO_4$.

In formulas above, A is selected from nickel (Ni), cobalt (Co), manganese (Mn), and a combination thereof; B' is selected from aluminum (Al), Ni, Co, Mn, chromium (Cr), iron (Fe), magnesium (Mg), strontium (Sr), vanadium (V), a rare earth element, and a combination thereof; D is selected from oxygen (O), fluorine (F), sulfur (S), phosphorus (P), and a combination thereof; E is selected from Co, Mn, and a combination thereof; F' is selected from F, S, P, and a combination thereof; G is selected from Al, Cr, Mn, Fe, Mg, lanthanum (La), cerium (Ce), Sr, V, and a combination thereof; Q is selected from titanium (Ti), molybdenum (Mo), Mn, and a combination thereof; I' is selected from Cr, V, Fe, Sc, yttrium (Y), and a combination thereof; and J is selected from V, Cr, Mn, Co, Ni, copper (Cu), and a combination thereof.

The compound may have a coating layer on a surface thereof, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound constituting the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a combination thereof. The coating layer may be disposed in a method (e.g., spray coating, dipping, and the like) having no adverse influence on properties of a positive active material by using these elements in the compound. A detailed description of such a deposition method of the coating layer will be omitted since it is well known to one of ordinary skill in the art.

Examples of the positive active material include lithium cobalt oxide (LCO), lithium nickel oxide, lithium nickel cobalt oxide, lithium nickel cobalt aluminum oxide (hereinafter, also referred to as 'NCA'), lithium nickel cobalt manganese oxide (hereinafter, also referred to as 'NCM'), lithium manganese oxide, lithium iron phosphate, nickel sulfide, copper sulfide, sulfur, iron oxide, and vanadium oxide. The examples of the positive active material may be used alone or in a combination of two or more thereof.

Among the examples of the positive active material, the positive active material particles 11 may include a lithium salt of a transition metal having a layered rock-salt structure. Here, the term 'layered' used herein refers to a shape of a thin sheet, and the term 'rock-salt structure' used herein refers to a sodium chloride-type structure as one of crystal structures in which face-centered cubic lattices respectively formed of anions and cations are shifted by only a half of the side of each unit lattice. The lithium salt of the transition metal having a layered rock-salt structure may include, for example, a lithium salt of a ternary transition metal oxide represented by $Li_{2-x-y-z}Ni_xCo_yAl_zO_2$ (NCA) or $Li_{2-x-y-z}Ni_x Co_yMn_zO_2$ (NCM) (where $0<x<1$, $0<y<1$, $0<z<1$, and $x+y+z$ is 1 or less).

Likewise, when the lithium salt of the ternary transition metal oxide is used as the positive active material particle 11, an all solid-state lithium ion battery having a high energy density and good thermal stability may be obtained. In addition, the lithium salt of the ternary transition metal oxide (existing in the form of an aggregate of a primary particle), e.g., NCA or NCM, has a particle diameter that is smaller than that of a LCO particle and a specific surface area that is about 10 times greater than that of a LCO particle. Accordingly, a contact area between the positive active material particle 11 and the solid electrolyte particle 31 increases, and thus an output of the lithium ion secondary battery 1 may increase to improve lithium ion conductivity. Also, when nickel is included in the positive active material particle 11, long-term reliability of the lithium ion secondary battery 1 in the charged state may improve since a capacity density of the lithium ion secondary battery 1 increases and an amount of metal dissolution in the charged state of the battery is small.

Coating Layer

As is further described above, the highly reactive layer 12 includes a highly reactive element, and may be formed entirely of a highly reactive element. The highly reactive element is, among elements other than lithium and oxygen, an element having higher reactivity with the sulfur element included in the solid electrolyte particles 31 (hereinafter, also referred to as 'reactivity to the solid electrolyte particles 31') than with the transition metal element included in the positive active material particles 11. In particular, the highly reactive element refers to, among elements other than lithium and oxygen, an element having lower standard enthalpy of formation for the sulfide than standard enthalpy of formation for the transition metal of the positive active material particles 11. When the positive active material particles 11 include various types of the transition metal elements, the highly reactive element has lower standard enthalpy of formation for the sulfide than that of all the transition metal elements included in the positive active material particle 11 (except for the highly reactive element included in the positive active material particle 11). In addition, when several types of sulfide may be produced from the high reactive element, the standard enthalpy of formation for all the produced sulfide meets the conditions above. In addition, the highly reactive layer 12 may include several types of the highly reactive element.

In particular, the standard enthalpy of formation for sulfide of the highly reactive element may be about −80.0 kJ/mol, to about −250 kJ/mol. When the standard enthalpy of formation for sulfide of the highly reactive element is within the ranges above, production of a high resistive layer is inhibited. In addition, as described above, the highly reactive element having lower standard enthalpy of formation for the sulfide than that of all the transition metal elements included in the positive active material particle 11 is needed. That is, the standard enthalpy of formation for the sulfide in the highly reactive element meets the conditions described above and is preferably within the ranges above.

When the positive active material particle 11 is coated with the highly reactive layer 12 described above, a reaction between the positive active material particle 11 and sulfide solid electrolyte particle 31 is inhibited, and such inhibition of the reaction may be confirmed according to, for example, differential scanning calorimetry (DSC). That is, DCS is performed to determine whether the metal element is a highly reactive element or not.

In particular, a first DCS is performed by mixing the coated particle 10a and the solid electrolyte particle 31 at a weight ratio of 1:1 and heating the mixture. Likewise, a second DCS is performed by mixing the positive active material particle 11 without the highly reactive layer 12 and the sulfide-containing solid electrolyte particle 31 at a weight ratio of 1:1 and heating the mixture. As a result, it is confirmed that an initiation temperature of an exothermic reaction in the first DSC is higher than that of an exothermic reaction in the second DSC.

That is, such an exothermic reaction represents a reaction, i.e., a side reaction, between the transition metal element of the positive active material particle 11 and the sulfur element of the solid electrolyte particle 31. Thus, it can be seen that a side reaction having a higher initiation temperature for the exothermic reaction will be less prevalent relative to reactions having a lower initiation temperature. For example, the initiation temperature of the exothermic reaction in the first DSC may be higher than about 250° C. When the initiation temperature of the exothermic reaction is within this range, the production of the high resistive layer may be inhibited.

In addition, in the first DSC, a temperature at which a calorific value (i.e., a calorific value caused by an exothermic reaction) reaches the maximum, i.e., a peak temperature of an exothermic reaction, may be higher than about 330° C., and for example, higher than about 350° C. When the peak temperature of the exothermic reaction is within the ranges above, the production of the high resistive layer is inhibited. Table 1 shows examples of the highly reactive element, examples of the sulfide of the highly reactive element, and standard enthalpies of formation for the sulfide. For reference, the standard enthalpy of formation for sulfide in a nickel element is −53 kJ/mol. That is, all the elements listed in Table 1 below have higher reactivity with the solid electrolyte particles 31 than with the nickel element.

TABLE 1

| Highly reactive element | Sulfide | Standard enthalpy of formation for sulfide (kJ/mol) |
| --- | --- | --- |
| Al | $Al_2S_3$ | −724 |
| Mg | MaS | −346 |
| Zr | ZrS | −566 |
| Ti | TiS | −407 |
| Ta | $TaS_2$ | −464 |
| Na | $Na_2S$ | −364.8 |
| K | $K_2S$ | −380.7 |
| Ca | CaS | −482 |
| Sr | SrS | −472 |
| Ba | BaS | −460 |
| In | $In_2S_3$ | −427 |
| Mo | $MoS_2$ | −276 |
|  | $Mo_2S_3$ | −407 |
| La | $La_2S_3$ | −1209 |
| Co | CoS | −82.8 |
|  | $Co_2S_3$ | −147.2 |
| Mn | MnS | −214.2 |

When the highly reactive layer 12, is too thick or too thin with respect to the particle diameter of the positive active material particle 11, it may not be effective. A ratio of the thickness of the highly reactive layer 12 to the particle diameter (i.e., a diameter of a sphere of a primary particle) of the positive active material particle 11 (hereinafter, also referred to a 'thickness-to-diameter ratio'), may be in a range of about 0.0010 to about 0.25, and for example, about 0.0016 to about 0.1. In an embodiment, the thickness-to-diameter ratio may be in a range of about 0.0016 to about 0.01. In addition, the thickness-to-diameter ratio may be obtained by, for example, dividing an arithmetic mean value of the thickness of the highly reactive layer 12 by an average particle diameter (D50) of the positive active material particle 11. Here, the arithmetic mean value of the thickness of the highly reactive layer 12 may be calculated as follows. First, a part of the coated particle 10a is prepared as a sample, and then, a thickness of highly reactive layer 12 is calculated for each sample. In particular, a measurement point is predetermined on the highly reactive layer 12, and then, a thickness of the highly reactive layer 12 is measured at the measurement point. Then, an arithmetic mean value of thicknesses measured at each measurement point is calculated, so as to measure a thickness of the highly reactive layer 12. An arithmetic mean value of thicknesses measured for each coated particle 10a is calculated, so as to calculate (or measure) an arithmetic mean value of a thickness of the highly reactive layer 12. In the following Examples, an arithmetic mean value of a thickness of layers is calculated by the method described herein. In addition, a thickness of the highly reactive layer 12 at each measurement point may be measured through observation of a cross-sectional view of the coated particle 10a by using a field emission scanning electron microscope (FE-SEM) (e.g., S-4800 available from Hitachi High-Technologies Ltd.) and based on analysis results on the elements by using an energy dispersive X-ray analyzer (e.g., model: EMAX ENERGY E-350 available from Horiba Ltd.). In addition, the average particle diameter D50 of the positive active material particle 11 may be measured by using a laser diffraction scattering type particle size distribution measuring apparatus (e.g., a micro-track MT-3000II available from Nikkiso Co., Ltd.).

In addition, a part of the highly reactive element may be included in the positive active material particle 11 in the form of a solid solution. That is, the highly reactive element may be a component of the positive active material particle 11. Here, a concentration of the highly reactive element included in the highly reactive layer 12 is greater than that of the highly reactive element included in the positive active material particle 11. In addition, X-ray photoelectron spectroscopy (SPX) or secondary ion mass spectrometry (SIMS) may be performed to determine whether the highly reactive element is included in the positive active material particle 11 and to measure the concentration of the highly reactive element. When the highly reactive element is included in the positive active material particle 11, the coated particle 10a may have a stacked structure of the highly reactive layer 12, a highly reactive element-containing layer, and a layer (particle) formed of the positive active material, which are stacked on a surface of the coated particle 10a in the stated order. In this regard, an element having high reactivity to the sulfide may be disposed near a surface of the coated particle 10a at a high concentration.

As such, the highly reactive element included in the positive active material particle 11, needs to be present in the surface of the positive active material particle 11. In the all solid-state lithium ion secondary battery 1, since the electrolyte is in a solid type, i.e., an electrolyte particle 31, the electrolyte does not penetrate into the positive active material particle 11. Thus, a side reaction between the electrolyte particle 31 and the positive active material particle 11 occurs at an interface between the solid electrolyte particle 31 and the positive active material particle 11, i.e., at the surface of the positive active material particle 11. In this regard, it is necessary to manage the surface of the positive active material particle 11. In the case of including the highly reactive element in the positive active material particle 11, the highly reactive element is present on the surface of the positive active material particle 11 (specifically, the surface of the positive active material particle 11 is covered by the highly reactive element).

Other Additives

The positive electrode layer 10 may include additives, for example, a conducting agent, a binding agent, an electrolyte, a filler, a dispersing agent, and an ion conducting agent, which may be appropriately selected and combined, in addition to the coated particle 10a. Examples of the conducting agent include graphite, carbon black, acetylene black, ketjen black, carbon fibers, and a metal powder. Examples of the binding agent include polytetrafluoroethylene, polyvinylidene fluoride, and polyethylene. An example of the electrolyte includes a sulfide-containing solid electrolyte, which will be described in detail. Also, the filler, the dispersing agent, and the ion conducting agent may be materials that are commonly used in manufacture of an electrode of a typical lithium ion secondary battery.

Negative Electrode Layer

Negative Active Material Particle

The negative electrode layer 20 according to an embodiment includes the negative active material particle 21, and any material that is alloyable with lithium or capable of reversibly intercalating and deintercalating lithium ions may be used without particular limitation.

For example, the negative active material particle 21 may include at least one selected from the group consisting of a lithium metal, a metal that is alloyable with lithium, a transition metal oxide, a non-transition metal oxide, a material that is capable of doping and dedoping of lithium ions, and a carbonaceous material.

Examples of the metal alloyable with lithium include Si, Sn, Al, indium (In), Ge, lead (Pb), bismuth (Bi), antimoy (Sb), a Si—Y' alloy (where Y' is an alkali metal, a alkali earth metal, a Group 13 element, a Group 14 element, a transition metal, a rare earth element, and a combination thereof except for Si), and a Sn—Y" alloy (where Y" is an alkali metal, a alkali earth metal, a Group 13 element, a Group 14 element, a transition metal, a rare earth element, and a combination thereof except for Sn). For example, Y' and Y" may each independently be Mg, Ca, Sr, barium (Ba), radium (Ra), scandium (Sc), Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), zinc (Zn), cadmium (Cd), boron (B), Al, Ga, Sn, In, Ge, P, As, Sb, Bi, S, selenium (Se), tellurium (Te), polonium (Po), or combinations thereof.

Examples of the transition metal oxide include a tungsten oxide, a molybdenum oxide, a titanium oxide, a lithium titanium oxide, a vanadium oxide, and a lithium vanadium oxide.

Examples of the non-transition metal oxide include $SnO_2$ and $SiO_x$ (0<x<2).

Examples of the doping and dedoping of lithium ions include Si, $SiO_2$, a Si—Y' alloy, Sn, $SnO_2$, a Sn—Y" alloy (where Y' and Y" are each independently an alkali metal, a alkali earth metal, a Group 11 element, a Group 12 element, a Group 13 element, a Group 14 element, a Group 15 element, a Group 16 element, a transition metal, a rare earth element, and a combination thereof except for Sn). For example, Y' and Y" may each independently be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

Examples of the carbonaceous material include crystalline carbon, amorphous carbon, or mixtures thereof. For example, the carbonaceous material may include natural graphite, artificial graphite, graphite carbon fibers, resin calcined carbon, thermal decomposition vapor-phase grown carbon, cokes, meso-carbon micro-beads (MCMBs), furfuryl alcohol resin calcined carbon, polyacene, pitch-based carbon fibers, vapor-phase grown carbon fibers, soft carbon (carbon sintered at low temperatures), hard carbon, or mesophase pitch carbides. The examples of the negative active material particle 21 may be used alone or in a combination of two or more thereof.

The carbonaceous material may be in amorphous, plate, flake, spherical, or fibrous form, or in combinations thereof. The examples of the negative active material particle 21 may be used alone or in a combination of two or more thereof.

Other Additives

The negative electrode layer 20 may include additives, for example, a conducting agent, a binding agent, an electrolyte, a filler, a dispersing agent, and an ion conducting agent, which may be appropriately selected and combined, in addition to the negative active material particle 21. Examples of the additives may be the same with those of the additives included in the positive electrode layer 10.

Solid Electrolyte Layer

The solid electrolyte layer 30 according to an embodiment includes the solid electrolyte particle 31. The solid electrolyte particle 31 is not particularly limited, so long as it is a sulfide-containing solid electrolyte particle. The solid electrolyte particle 31 may be a sulfide-containing solid electrolyte particle containing at least one of Li, P, and S. The sulfide-containing solid electrolyte is known for its high lithium ion conductivity compared to that of other inorganic compounds. The sulfide-containing solid electrolyte particle may be $Li_2S$ or $P_2S_5$, but may also include sulfides, such as $SiS_2$, $GeS_2$, and $B_2S_3$. Also, $Li_3PO_4$, halogen, or a halogen compound may be appropriately added to the solid electrolyte particle 31.

Preparation Method of Lithium Ion Secondary Battery)

The structure of the lithium ion secondary battery 1 according to an embodiment has been described thus far, and a method of preparing the lithium ion secondary battery 1 having the structure above will be described in detail hereinafter. The lithium ion secondary battery 1 may be manufactured by first preparing the positive electrode layer 10, the negative electrode layer 20, and the solid electrolyte layer 30, and then stacking each of the layers. Hereinafter, each of the processes will be described in detail.

Preparation of Coated Particle

First, a method of preparing the coated particle 10a will be described. In an embodiment, a co-deposition method may be used to prepare the coated particle 10a. A preparation method of the coated particle 10a is not particularly limited, and any method that coats the positive active material particle with the highly reactive element may be used.

An aqueous urea solution is added to an aqueous nitrate solution of the highly reactive element, and then, a transition metal hydroxide as a material for the positive active material is dispersed in the mixed solution.

Then, the transition metal dispersion is maintained at a temperature of 100° C. in a nitrogen atmosphere to decompose the elements. Accordingly, due to an increase in the pH of the transition metal dispersion, the hydroxide of the highly reactive element may be deposited on the surface of the transition metal oxide.

The sample obtained therefrom is dried, and then, mixed with a lithium hydroxide powder. Then, the mixed powder is subjected to calcination in the air. A temperature for the calcinations is not particularly limited, but may be about 1,000□. Accordingly, the coated particle 10a is prepared according to the process above. Here, the thickness of the highly reactive layer 12 may be adjusted by controlling at least one of the mass of the transition metal oxide to be added to the respective aqueous nitrate solution and the period of time required for the reaction in the aqueous nitrate solution based on the fixed concentration of the aqueous nitrite solution of the highly reactive element. Alternatively, the thickness of the highly reactive layer 12 may be adjusted by managing a period of time required for calcination. Alternatively, the thickness of the highly reactive layer 12 may be adjusted by controlling at least one of the mass of the transition metal oxide and the period of time for the reaction along with managing the period of time for the calcination. In addition, according to the calcinations, a portion of the highly reactive element included in the highly reactive layer 12 may be included in the positive active material particle 11 in a form of a solid solution. Under the conditions with higher temperature and longer period of time for the calcinations, a large amount of the highly reactive element may be included in the positive active material particle 11 in the form of a solid solution. However, according to the preparation method described herein, the highly reactive layer 12 is formed of the highly reactive elements only, and thus has a higher concentration of the highly reactive elements than that of the highly reactive elements included in the positive active material particle 11.

Preparation of Solid Electrolyte Particle

A method of preparing the solid electrolyte particle 31 is not particularly limited, and the solid electrolyte particle 31 may be prepared according to the methods known in the art.

For example, the solid electrolyte particle 31 may be prepared according to a melt-quenching method or a mechanical milling method (hereinafter, also referred to as 'MM' method). Hereinafter, as an example of the method of preparing the solid electrolyte particle 31, a method of combining $Li_2S$ and $P_2S_5$ will be described.

In regard to the melt-quenching method, $Li_2S$ and $P_2S_5$ are mixed together in a small amount, and are then pelletized. A pellet of $Li_2S$ and $P_2S_5$ is heat-treated in a vacuum at a given reaction temperature, and then, rapidly cooled to obtain a sulfide-containing solid electrolyte. A heat treating temperature may be, for example, in a range of about 400° C. to about 1,000° C., and for example, about 800° C. to about 900° C. In addition, a reaction time may be, for example, in a range of about 0.1 hour to about 12 hours, and for example, about 1 hour to about 12 hours. In addition, a quenching temperature may be, for example, 10° C. or lower, and for example, 0° C. or lower. A quenching velocity may be, for example, in a range of about 1 K/sec to about 10,000 K/sec, for example, about 1 K/sec to about 1,000 K/sec.

In regard to the MM method, $Li_2S$ and $P_2S_5$ are mixed together in a small amount, and then mechanically milled for a predetermined reaction time to obtain a sulfide-containing solid electrolyte. In the MM method using $Li_2S$ and $P_2S_5$, a reaction may occur at room temperature. According to the MM method, since the solid electrolyte may be prepared at room temperature, thermal decomposition of the raw materials may be avoided, and thus a solid electrolyte may be easily obtained. Rotation speed and rotation time of the MM method are not particularly limited, but the production of the solid electrolyte speeds up with faster rotational speed. In addition, the raw materials are more likely to be converted into the solid electrolyte according to a longer period of the rotational time.

Afterwards, the prepared solid electrolyte was heat-treated at a predetermined temperature, and then, was pulverized to obtain solid electrolyte particles 31. Here, a mixing ratio of the sulfides is set so that a molar ratio of $Li_2S$ to $P_2S_5$ is generally in a range of about 50:50 to about 80:20, and for example, about 60:40 to about 75:25.

Preparation of Positive Electrode Layer

A mixture of the coated particle 10a, the solid electrolyte particle 31, and various additives may be added to a solvent to prepare a positive electrode mixture in a form of slurry of paste. Here, the solvent is not particularly limited, so long as it may be used in preparation of a positive electrode mixture. For example, the solvent may be a non-polar solvent that does not easily react with the solid electrolyte particle 31. Subsequently, a current collector is coated with the positive electrode mixture obtained therefrom by using a doctor blade. Then, the current collector and a layer of the positive electrode mixture are compressed by using a roll-press to prepare the positive electrode layer 10.

The current collector may be, for example, a plate-like or a thin-shaped body formed of stainless steel, titanium, aluminum, or an alloy thereof. Also, when the current collector is not used, the positive electrode mixture may be press-molded into a form of pellet to prepare the positive electrode layer 10.

Preparation of Negative Electrode Layer

The negative electrode layer 20 may be prepared as follows. For example, a mixture of the negative active material particle 21, the solid electrolyte particle 31, and additives may be added to a solvent to prepare a negative electrode mixture in a form of slurry or paste. The solvent is not particularly limited, so long as it may be used in preparation of a positive electrode mixture. For example, the solvent may be a non-polar solvent that does not easily react with the solid electrolyte particle 31. Subsequently, a current collector is coated and dried with the negative electrode mixture obtained therefrom by using a doctor blade. Then, the current collector and a layer of the negative electrode mixture are compressed by using a roll-press to prepare the negative electrode layer 20.

The current collector may comprise, for example, a plate-like or a thin-shaped body formed of copper, stainless steel, nickel, or an alloy thereof. Also, when the current collector is not used, the mixture of the negative active material particle 21 and additives may be press-molded into a form of pellet to prepare the negative electrode layer 20. Also, when the negative active material particle 21 is formed of a metal or an alloy thereof, a metal sheet (a foil) may be used as it is.

Preparation of Solid Electrolyte Layer

The solid electrolyte layer 30 may be prepared as follows. The solid electrolyte particle 31 may be used in a known layer-forming method, such as a blast method, an aerosol deposition method, a cold spray method, a sputtering method, a chemical vapor deposition (CVD) method, or a spray method, to prepare the solid electrolyte layer 30. Also, a layer-forming method including steps of coating a support with a solution prepared by mixing the solid electrolyte particle 31, a solvent, and a binder (e.g., an adhesive and a polymer compound) and removing the solvent from the solution may be used. Also, the solid electrolyte particle 31 itself or an electrolyte prepared by mixing the solid electrolyte particle 31, a binder (e.g., an adhesive or a polymer compound), and a support (which is material or a compound that enhances strength of the solid electrolyte layer 30 and prevents short-circuit of the solid electrolyte particle 31) may be pressed to form a layer.

Stacking Layers

The positive electrode layer 10, the solid electrolyte layer 30, and the negative electrode layer 20 prepared above are sequentially stacked in the stated order, and then pressed to prepare the lithium ion secondary battery 1 according to an embodiment.

EXAMPLES

Hereinafter, one or more embodiments of the present invention will be described in detail with reference to the following examples. However, these examples are not intended to limit the scope of the one or more embodiments of the present inventive concept.

Preparation 1 of Coated Particle

The coated particle 10a was prepared as follows: 100 ml of an urea solution (0.16 mol/L) was added to 100 ml of an aqueous solution of aluminum nitrate (0.15 mol/L). Then, 60 g of transition metal hydroxide ($(Mn, Co, Ni)_{1/3}(OH)_2$) as a raw material of the active material was dissolved in the mixed aqueous solution.

Then, the dispersion was maintained at a temperature of 100° C. in a nitrogen atmosphere to decompose the urea. Accordingly, the pH of the dispersion increased, and aluminum hydroxide was deposited on the surface of the transition metal hydroxide.

The sample obtained therefrom was dried, and then, mixed with a hydroxide powder. Then, the mixed powder was calcined in air at a temperature of 1,000° C. for 10 hours, thereby obtaining the coated particle 10a according to Preparation Example 1 (hereinafter, also referred to as 'coated particle 10a-1'). The positive active material particle 11 included in the coated particle 10a-1 is formed of $LiNi_{1/3}Co_{1/3}Mn_{1/3}O_2$ (NCM333), and the highly reactive layer 12 of the coated particle 10a-1 is formed of aluminum.

The average particle diameter D50 of the positive active material particle 11 was measured by using a laser diffraction scattering type particle size distribution measuring apparatus (e.g., a micro-track MT-3000II available from Nikkiso Co., Ltd.), and the result was about 5.0 μm. In addition, the arithmetic mean value of the thickness of the coated particle 10a coated with the highly reactive layer 12 was calculated according to the method described above, and the result was about 8.0 nm. The thickness at respective measurement points was measured through observation of a cross-sectional view of the coated particle 10a by using an FE-SEM (e.g., S-4800 available from Hitachi High-Technologies Ltd.) and based on analysis using an energy dispersive X-ray analyzer (e.g., model: EMAX ENERGY E-350 available from Horiba Ltd.). Thus, the thickness-to-diameter ratio was about 0.0016. In addition, according to X-ray photoelectron spectroscopy, it was confirmed whether a part of the highly reactive layer 12 was included in the positive active material particle 11.

Preparation 2 of Coated Particle

The coated particle 10a (hereinafter, also referred to as 'coated particle 10a-2) was obtained in the same manner as in Preparation Example 1, except that the amount of the transition metal hydroxide was changed to 10 g. In addition, the thickness-to-diameter ratio of the coated particle 10a-2 was measured in the same manner as in Preparation Example 1, and the result was about 0.01.

Preparation 3 of Coated Particle

The coated particle 10a (hereinafter, also referred to as 'coated particle 10a-3) was obtained in the same manner as in Preparation Example 1, except that the amount of the transition metal hydroxide was changed to 2.5 g. In addition, the thickness-to-diameter ratio of the coated particle 10a-3 was measured in the same manner as in Preparation Example 1, and the result was about 0.10.

Preparation 4 of Coated Particle

The coated particle 10a (hereinafter, also referred to as 'coated particle 10a-4) was obtained in the same manner as in Preparation Example 1, except that the amount of the transition metal hydroxide was changed to 2.5 g and the mixed powder was calcined for 24 hours. In addition, the thickness-to-diameter ratio of the coated particle 10a-4 was measured in the same manner as in Preparation Example 1, and the result was about 0.25.

Preparation 5 of Coated Particle

The coated particle 10a (hereinafter, also referred to as 'coated particle 10a-5) was obtained in the same manner as in Preparation Example 1, except that the amount of the transition metal hydroxide was changed to 80 g. In addition, the thickness-to-diameter ratio of the coated particle 10a-5 was measured in the same manner as in Preparation Example 1, and the result was about 0.0010.

Preparation 6 of Coated Particle

The coated particle 10a (hereinafter, also referred to as 'coated particle 10a-6) was obtained in the same manner as in Preparation Example 1, except that a mixed solution (0.075 mol/L) in which aluminum nitrate and magnesium nitrate were dissolved was used instead of the aqueous solution of aluminum nitrate (0.15 mol/L), and the amount of the transition metal hydroxide was changed to 10 g. The coated layer 12 was formed of aluminum and magnesium only, and a molar ratio of aluminum to magnesium was 1:1. In addition, the thickness-to-diameter ratio of the coated particle 10a-6 was measured in the same manner as in Preparation Example 1, and the result was about 0.010.

Preparation 7 of Coated Particle

The coated particle 10a (hereinafter, also referred to as 'coated particle 10a-7) was obtained in the same manner as in Preparation Example 1, except that an aqueous solution of cobalt nitrate (0.15 mol/L) was used instead of the aqueous solution of aluminum nitrate (0.15 mol/L), and 10 g of nickel hydroxide was used instead of 60 g of transition metal hydroxide. The positive active material particle 11 was formed of lithium nickelate, and the highly reactive layer 12 was formed of cobalt. In addition, the thickness-to-diameter ratio of the coated particle 10a-7 was measured in the same manner as in Preparation Example 1, and the result was about 0.009.

Preparation 8 of Coated Particle

The coated particle 10a (hereinafter, also referred to as 'coated particle 10a-8) was obtained in the same manner as in Preparation Example 1, except that the amount of the transition metal hydroxide was changed to 100 g and the mixed powder was calcined for 2 hours. In addition, the thickness-to-diameter ratio of the coated particle 10a-8 was measured in the same manner as in Preparation Example 1, and the result was about less than 0.0010.

Preparation 9 of Coated Particle

The coated particle 10a 6(hereinafter, also referred to as 'coated particle 10a-4) was obtained in the same manner as in Preparation Example 1, except that the amount of the transition metal hydroxide was changed to 2.5 g and the mixed powder was calcined for 50 hours. In addition, the thickness-to-diameter ratio of the coated particle 10a-9 was measured in the same manner as in Preparation Example 1, and the result was about greater than 0.25.

DSC Test on the Coated Particles of Preparations 1 and 6

Figure 2:
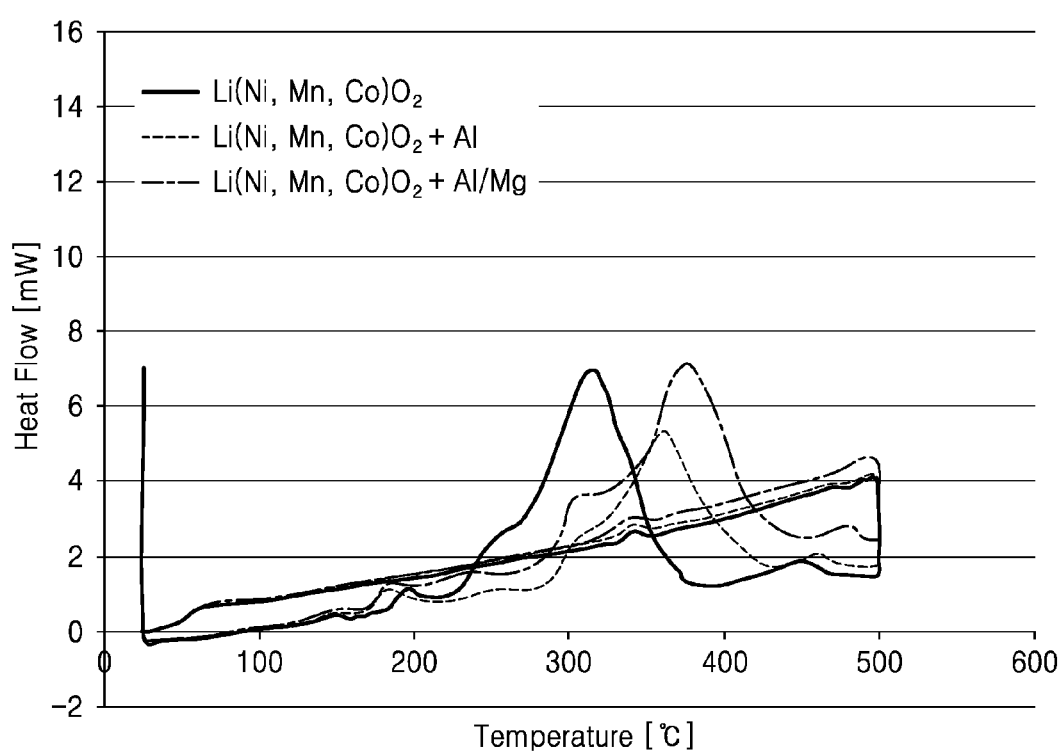
FIG. 2 is a graph showing the results obtained by a differential scanning calorimetry (DSC) test on a mixture of a positive active material particle and a sulfide-containing solid electrolyte particle.

Following the preparation of the coated particles, to evaluate the reactivity between the solid electrolyte particle 31 and the coated particles 10a-1 and 10a-6 prepared according to Preparation Examples 1 and 2, a DSC test that will be described in detail was carried out. The solid electrolyte particle 31, $Li_2S-P_2S_5$ (80-20 mol %), was subjected to the mechanical milling treatment (MM treatment). Then, the coated particle 10a-1 and the solid electrolyte particle 31 were mixed at a weight ratio of 1:1 in a glove box. Then, a temperature at which an exothermic reaction started in the mixture was evaluated by using a differential scanning calometer (THERMO plus EVO II/DSC8230 available from Rigaku Ltd.). The coated particle 10a-6 was also evaluated in the same manner regarding the initiation temperature. In addition, the NCM333 particle (i.e., positive active material particle 11) not coated with the highly reactive layer 12 was prepared and evaluated in the same manner regarding the initiation temperature. The evaluation results are shown in FIG. 2. In FIG. 2, the horizontal axis represents a temperature, and the vertical axis represents a heat flow. In FIG. 2, 'Li(Ni, Mn, Co)O$_2$+Al' denotes the coated particle 10a-1, 'Li(Ni, Mn, Co)O$_2$+Al/Mg' denotes the coated particle 10a-6, and 'Li(Ni, Mn, Co)O$_2$' denotes the NCM333 particle (i.e., the positive active material particle 11) not coated with the highly reactive layer 12.

As shown in FIG. 2, it was confirmed that the initiation temperature for the exothermic reaction in the coated particles 10a-1 and 10a-6 was higher than that in the NCM333 particle. In detail, the initiation temperature for the exothermic reaction in the coated particles 10a-1 and 10a-6 was about 290° C., whereas the initiation temperature for the exothermic reaction in the NCM333 particle was about 210° C. In addition, the initiation temperature for the exothermic reaction in the coated particles 10a-1 and 10a-6 at the maximum was in a range of about 350 to about 380° C., whereas the initiation temperature for the exothermic reaction in the NCM333 particle at the maximum was about 310° C.

The exothermic reaction is considered as a reaction, i.e., a side reaction, between the transition metal included in the positive active material particle 11 and the sulfur element included in the solid electrolyte particle 31. Thus, the side reaction was reduced in the coated particles 10a-1 and 10a-6 compared to the NCM333 particle (i.e., the positive active material particle 11) not coated with the highly reactive layer 12. As a result, it was confirmed that the coating of the positive active material particle 11 with the highly reactive layer 12 that was composed of the highly reactive elements, reduced the side reaction therein (i.e., the production of the high resistive layer was inhibited).

DSC Test on the Coated Particles of Preparations 2 to 5

The same DSC test was performed in the same manner as in 8.1, except that the coated particles 10a-2 to 10a-5 were used instead of the coated particle 10a-1, thereby obtaining similar results with those of 8.1.

DSC Test on the Coated Particle of Preparation 7

The coated particle 10a-7 and the solid electrolyte particle 31 prepared in 8.1. were mixed together at a weight ratio of 1:1. Then, the same DSC test was performed thereon in the same manner as in 8.1. In addition, the lithium nickelate particle (i.e., positive active material particle 11) not coated with the highly reactive layer 12 was prepared, and the same DSC test was performed thereon in the same manner as in 8.1, thereby obtaining similar results with those of 8.1.

Example 1

By the following process, an all solid-state lithium ion secondary battery 1 was prepared. A lithium foil (with a thickness of 0.03 mm) used as the negative electrode layer 20 was punched into ϕ13 (mm) size, and then, placed in a cell container. On top of the lithium foil, 80 mg of the solid electrolyte particle 31 prepared in 8.1 was stacked, and then, a surface thereof was lightly trimmed according to a molding process, thereby forming an electrolyte layer 30. Subsequently, a mixture of the coated particle 10a-1, the solid electrolyte particle 31 prepared in 8.1, and VGCF as a binding agent were mixed at a weight % ratio of 60:35: 5, and used as a positive electrode mixture to be stacked on the SE (i.e. the electrolyte layer 30). Then, a pressure of 3 t/cm$^2$ was applied to the laminate to be compressed and pelletized, thereby preparing a test cell for Example 1.

The prepared test cell was charged with a constant current of 0.02 C at a temperature of 25° C. until an upper voltage limit reached 4.0 V, and then, discharged with a constant current of 0.1 C until a final discharge voltage reached 2.5 V. Such a charging/discharging cycle was repeated 30 times. Afterwards, the impedance of the lithium ion secondary battery 1 was measured, and based on the measured results, the interface resistance was calculated. The impedance was measured according to an alternating current impedance method.

Examples 2 to 7

All solid-state lithium ion secondary batteries were prepared and treated in the same manner as in Example 1, except that the coated particles 10a-2 to 10a-7 were each used instead of the coated particle 10a-1.

Comparative Examples 1 to 4

All solid-state lithium ion secondary batteries were prepared and treated in the same manner as in Example 1, except that the coated particle 10a-8, the coated particle 10a-9, the NCM333 particle, and the lithium nickelate particle were each used instead of the coated particle 10a-1.

Evaluation of Interface Resistance

The thickness-to-diameter ratio and the interface resistance in the all solid-state lithium ion secondary batteries of Examples 1 to 7 and Comparative Examples 1 to 4 are summarized in Table 2 below.

TABLE 2

| | Particle | Thickness-to-diameter ratio | Interface resistance |
|---|---|---|---|
| Example 1 | 10a-1 | 0.0016 | 250 |
| Example 2 | 10a-2 | 0.010 | 230 |
| Example 3 | 10a-3 | 0.10 | 380 |
| Example 4 | 10a-4 | 0.25 | 500 |
| Example 5 | 10a-5 | 0.0010 | 480 |
| Example 6 | 10a-6 | 0.010 | 202 |
| Example 7 | 10a-7 | 0.0090 | 300 |
| Comparative Example 1 | 10a-8 | <0.0010 | 650 |
| Comparative Example 2 | 10a-9 | >0.25 | >1000 |
| Comparative Example 3 | NCM333 | | 660 |
| Comparative Example 4 | lithium nickelate | | >1000 |

Figure 3:
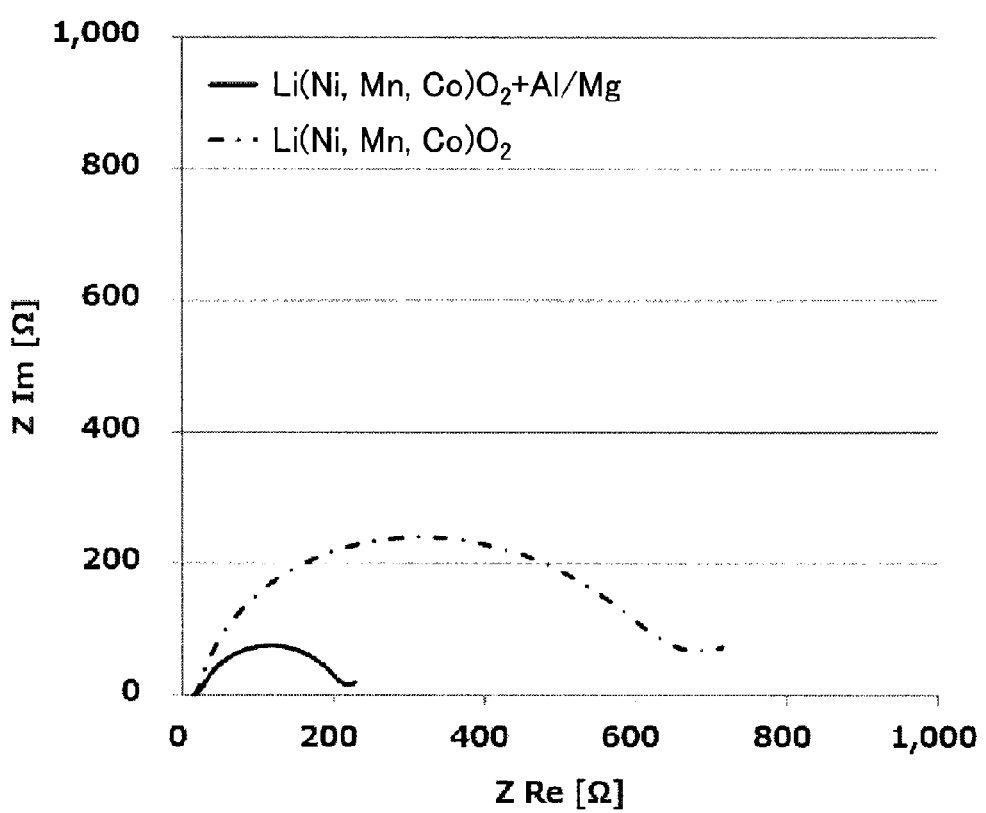
FIG. 3 is a graph showing the results of an impedance evaluation with respect to positive electrodes prepared in Examples and Comparative Examples.

Referring to Table 2, it was confirmed that the interface resistance values of the all solid-state lithium ion secondary batteries of Examples 1 to 6 were all lower than those of the all solid-state lithium ion secondary batteries of Comparative Examples 1 to 3. That is, it was confirmed that the production of the high resistive layer was inhibited in the all solid-state lithium ion secondary batteries of Examples 1 to 6 compared to the production of the high resistive layer in the all solid-state lithium ion secondary batteries of Comparative Examples 1to 3. FIG. 3 is a graph showing the impedance values of the all solid-state lithium ion secondary batteries of Example 6 (represented as 'Li(Ni, Mn, Co)O$_2$+Al/Mg') and Comparative Example 3 (represented as 'Li(Ni, Mn, Co)O$_2$'). In FIG. 3, the horizontal axis represents a real part of the impedance, and the vertical axis represents a false part of the impedance. That is, FIG. 3 is a complex impedance plot diagram (i.e., nyquist diagram). As shown in FIG. 3, the interface resistance of the all solid-state lithium ion secondary battery of Example 6 is lower than that of all solid-state lithium ion secondary battery of Comparative Example 3. In addition, in comparison between the all solid-state lithium ion secondary batteries of Examples 1 and 2 and the all solid-state lithium ion secondary batteries of Examples 3 to 5, the interface resistance of the all solid-state lithium ion secondary batteries of Examples 1 and 2 is lower than that of the all solid-state lithium ion secondary batteries of Examples 3 to 5. In addition, in comparison between the all solid-state lithium ion secondary battery of Example 3 and the comparison between the all solid-state lithium ion secondary batteries of Examples 4 and 5, the interface resistance of the all solid-state lithium ion secondary battery of Example 3 is lower than that of the all solid-state lithium ion secondary batteries of Examples 4 and 5. Thus, the ratio of thickness to particle diameter of the all solid-state lithium ion secondary batteries is in a range of about 0.0016 to about 0.1, and for example, about 0.0016 to about 0.01.

In addition, as a result of comparing the impedance values between the all solid-state lithium ion secondary battery of Example 7 the all solid-state lithium ion secondary battery of Comparative Example 4, it was confirmed that the impedance of the all solid-state lithium ion secondary battery of Example 7 is lower than the impedance of the all solid-state lithium ion secondary battery of Comparative Example 4. Accordingly, it was confirmed that the production of the high resistive layer was further inhibited in the all solid-state lithium ion secondary battery of Example 7 than in the all solid-state lithium ion secondary battery of Comparative Example 4.

As described above, according to the one or more of the above exemplary embodiments, provided is a positive electrode that can further inhibit a reaction occurring at an interface between a positive active material particle and a sulfide-containing solid electrolyte particle in a lithium ion secondary battery including a sulfide-containing solid electrolyte.

It should be understood that exemplary embodiments described herein should be considered in a descriptive sense only and not for purposes of limitation. Descriptions of features, advantages, or aspects within each embodiment should be considered as available for other similar features, advantages, or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A positive electrode for a lithium ion secondary battery, the positive electrode comprising:
   a coated particle comprising a positive active material particle and a reactive layer on a surface of the positive active material particle; and
   a sulfide-containing solid electrolyte particle which is in contact with the coated particle,
   wherein the reactive layer consists of a reactive element other than lithium and oxygen, wherein the reactive element has a reactivity with the sulfide-containing solid electrolyte particle which is greater than a reactivity of the reactive element with a transition metal element included in the positive active material particle, and
   wherein a ratio of a thickness of the reactive layer to a particle diameter of the positive active material particle is in a range of about 0.0010 to about 0.25.

2. The positive electrode of claim 1, wherein the reactive element has a standard enthalpy of formation for sulfide that is less than a standard enthalpy of formation for sulfide of the transition metal element included in the positive active material particle.

3. The positive electrode of claim 2, wherein a standard enthalpy of formation for sulfide of the reactive element is less than about −80 kiloJoules per mole.

4. The positive electrode of claim 1, wherein a first initiation temperature of an exothermic reaction of a first mixture, which comprises a 1:1 mass ratio of the coated particle and the sulfide-containing solid electrolyte particle, is greater than a second initiation temperature of an exothermic reaction of a second mixture, which comprises a 1:1 mass ratio combination of the positive active material particle, which is not covered with the reactive layer, and the sulfide containing solid electrolyte particle, when analyzed by differential scanning calorimetry.

5. The positive electrode of claim 4, wherein the initiation temperature for the exothermic reaction of the first mixture is greater than 250° C.

6. The positive electrode of claim 5, wherein a temperature at which a calorific value of the first mixture reaches a greatest value is greater than 330° C.

7. The positive electrode of claim 1, wherein at least a portion of the reactive element is included in the positive active material particle in the form of a solid solution.

8. The positive electrode of claim 1, wherein the reactive element includes at least one selected from aluminum, magnesium, zirconium, titanium, tantalum, sodium, potassium, calcium, strontium, barium, indium, molybdenum, lanthanum, cobalt, and manganese.

9. The positive electrode of claim 8, wherein the reactive element includes at least one selected from aluminum, cobalt, manganese, and magnesium.

10. The positive electrode of claim 1, wherein the sulfide-containing solid electrolyte particle comprises phosphorus.

11. A lithium ion secondary battery comprising:
    the positive electrode of claim 1;
    a negative electrode comprising a negative active material; and
    a solid electrolyte layer disposed between the positive electrode and the negative electrode, the solid electrolyte layer comprising a sulfide-containing solid electrolyte particle.

12. A process of making a positive electrode for a lithium ion secondary battery, the process comprising:
    providing a sulfide-containing solid electrolyte particle;
    providing a positive active material particle containing a transition metal;
    coating the positive active material particle with a reactive layer consisting of a reactive element other than lithium and oxygen, wherein the reactive element has a reactivity with the sulfide-containing solid electrolyte particle which is greater than a reactivity of the reactive element with a transition metal element included in the positive active material particle; and
    contacting the sulfide-containing solid electrolyte particle with the coated particle, wherein a ratio of a thickness of the reactive layer to a particle diameter of the positive active material particle is in a range of about 0.0010 to about 0.25 to make the positive electrode.

13. The process of claim 12, wherein at least a portion of the reactive element is included in the positive active material particle in the form of a solid solution.

14. A process of making a lithium ion secondary battery having a positive electrode and a negative electrode, the process comprising disposing a solid electrolyte layer comprising a sulfide-containing solid electrolyte particle coated with a reactive layer between the positive electrode and the negative electrode.

15. The process of claim 14, wherein the sulfide-containing solid electrolyte particle comprises phosphorus.

* * * * *